United States Patent [19]

Shimauchi

[11] Patent Number: 5,058,422
[45] Date of Patent: Oct. 22, 1991

[54] ELECTRONIC BALANCE

[75] Inventor: Kunio Shimauchi, Kyoto, Japan

[73] Assignee: Shimadzu Corporation, Kyoto, Japan

[21] Appl. No.: 551,311

[22] Filed: Jul. 12, 1990

[30] Foreign Application Priority Data

Jul. 24, 1989 [JP] Japan .................................. 1-190781

[51] Int. Cl.$^5$ .............................................. G01G 7/00
[52] U.S. Cl. ...................................................... 73/1 B
[58] Field of Search ...................................... 73/1 B;
364/571.01-571.06; 177/50, 25.11

[56] References Cited

U.S. PATENT DOCUMENTS

| 3,976,150 | 8/1976 | Wilson et al. | 73/1 B |
|---|---|---|---|
| 4,457,386 | 7/1984 | Schett et al. | 177/212 |
| 4,535,854 | 8/1985 | Gard et al. | 177/50 |
| 4,535,857 | 8/1985 | Haze | 177/50 |
| 4,660,662 | 4/1987 | Katz | 73/1 B |
| 4,703,815 | 11/1987 | Hirano et al. | 73/1 B |
| 4,909,338 | 3/1990 | Vitunic et al. | 73/1 B |
| 4,932,486 | 6/1990 | Komoto et al. | 73/1 B |
| 4,932,487 | 6/1990 | Melcher et al. | 73/1 B |

FOREIGN PATENT DOCUMENTS 0093183  11/1983  European Pat. Off. .............. 177/50

Primary Examiner—Robert Raevis
Attorney, Agent, or Firm—Fidelman & Wolffe

[57] ABSTRACT

Method and apparatus for calibrating the sensitivity and linearity of the weighing means of an electronic balance, wherein a sensitivity calibration is automatically conducted when the ambient temperature has changed a first predetermined amount or a predetermined period of time has passed since the previous calibration was conducted, and when a sensitivity calibration is conducted, it is checked whether or not the temperature change has exceeded a second predetermined amount greater than the first predetermined amount, and only when the temperature change has exceeded the second predetermined amount since the previous linearity calibration was conducted, a linearity calibration is conducted along with the sensitivity calibration.

6 Claims, 2 Drawing Sheets

ELECTRONIC BALANCE

BACKGROUND OF THE INVENTION

This invention relates to an electronic balance which has both a function of automatic sensitivity calibration and a function of automatic linearity calibration.

Generally, the electronic balances which have a function of automatic sensitivity calibration are provided with a built-in weight for sensitivity calibration and a mechanism for loading and unloading the weight on and from the load sensor of the balance, so that upon occurrence of a certain amount of change in the ambient temperature or lapse of a predetermined period of time, the calibration weight is automatically put on the load sensor, the output of which is compared with the mass of the calibration weight stored therein beforehand so as to change the sensitivity coefficient.

In such electronic balances as mentioned above, by providing a plurality of calibration weights and placing all of them simultaneously or each of them separately and successively on the load sensor, it is possible to perform both sensitivity and linearity calibrations simultaneously. The sensitivity calibration can be conducted on the basis of the output data of the load sensor obtained at zero point, that is, when no load is applied to the load sensor and the output data thereof obtained at a point of measurement near the maximum weight that can be measured by the balance, that is, when a weight of a known mass near the maximum measurable weight of the balance is applied thereto. For linearity calibration, however, it is necessary to have measurement data obtained at one more point between the above-mentioned two points. To this end, there may be provided two calibration weights, the total mass of which approximates the maximum measurable weight of the balance, so that by using the data obtained when both the weights are loaded on the balance and the data obtained when only one of them is loaded thereon it is possible to perform both sensitivity and linearity calibrations.

In conventional electronic balances having the above-mentioned functions, as previously mentioned, when a predetermined amount of change has occurred in the ambient temperature or a predetermined period of time has passed, a linearity calibration is always conducted along with sensitivity calibration.

Needless to say, it is desirable that the time required for such calibration should be as short as possible. In known balances capable of both sensitivity and linearity calibration it is necessary to load and unload a plurality of built-in weights on and from the load sensor, so that a long period of time is required for the operation of calibration.

Accordingly, the primary object of the invention is to make shorter than otherwise the time required for the operation of calibration in an electronic balance capable of sensitivity and linearity calibration.

SUMMARY OF THE INVENTION

In accordance with the invention, there is provided a method of calibrating the sensitivity and linearity of the weighing means of an electronic balance, comprising:

automatically conducting a sensitivity calibration when the ambient temperature has changed a first predetermined amount or a predetermined period of time has passed since the previous calibration was conducted;

checking whether or not the temperature change has exceeded a second predetermined amount greater than the first predetermined amount whenever a sensitivity calibration is conducted; and conducting a linearity calibration only when the temperature change has exceeded the second predetermined amount since the previous linearity calibration was conducted.

In accordance with the invention, there is further provided an electronic balance which comprises:

weighing means including a load sensor and a temperature sensor for detecting the ambient temperature of the load sensor;

a plurality of built-in calibration weights;

means for loading and unloading the calibration weights on and from the load sensor;

means for indicating the mass of an object being measured; and a controller so arranged as to automatically conduct a calibration of the sensitivity of the load sensor when the ambient temperature has changed a first predetermined amount or a predetermined period of time has passed since the previous calibration was conducted, and check whether or not the temperature change has exceeded a second predetermined amount greater than said first predetermined amount, and conduct a calibration of the linearity of the load sensor only when the temperature change has exceeded the second predetermined amount since the previous linearity calibration was conducted.

It is only when a change exceeding a predetermined amount has occurred to the ambient temperature around the weighing means of the balance since the previous linearity calibration was conducted that a linearity calibration needs to be conducted. The amount of tempeature change that requires linearity calibration is generally far greater than the amount of temperature change that requires sensitivity calibration. The invention relies on the fact.

In accordance with the invention, when a temperature change greater than a first predetermined amount has occurred, or a predetermined period of time has elapsed, a sensitivity calibration is conducted. The sensitivity calibration, however, is not accompanied by a linearity calibration unconditionally, but it is first checked whether or not the amount of temperature change that has occurred since the previous linearity calibration was conducted has exceeded a second predetermined amount greater than the first predetermined amount, and a linearity calibration is conducted along with the sensitivity calibration only when the temperature change has exceeded the second predetermined amount.

The sensitivity calibration is conducted by renewing the sensitivity coefficient of the weighing means of the balance by the measurement data obtained from the weighing means when the calibration weights are simultaneously loaded on the weighing means, the measurement data obtained from the weighing means when no load is applied thereto, and the actual mass of the calibration weights.

The linearity calibration is conducted by renewing the coefficient in the equation for linearity calibration by the measurement data obtained from the weighing means when the calibration weights are loaded simultaneously on the weighing means, the measurement data obtained from the weighing means at zero point, and the data at an intermediate point obtained from the individual data obtained when each of the calibration weights is separately loaded on the weighing means.

PREFERRED EMBODIMENTS OF THE INVENTION

Figure 1:
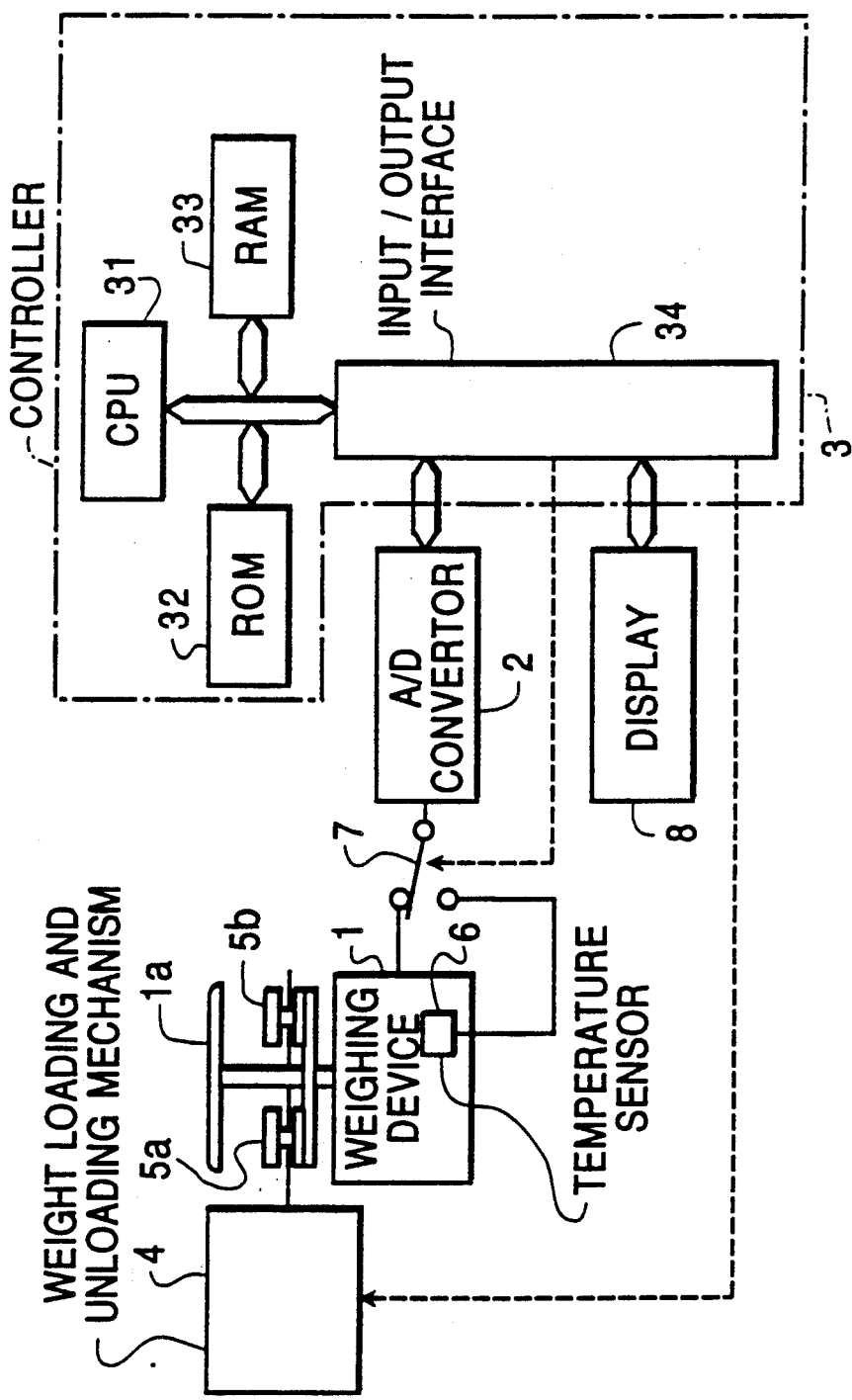
FIG. 1 is a block diagram showing one embodiment of the invention.

Referring to FIG. 1, there is shown a weighing device 1 including a load sensor, not shown, and having a pan 1a. When an object to be measured is placed on the pan 1a, the load sensor produces a corresponding electrical signal, which is digitized by an A-D convertor 2 and applied to a controller 3.

The weighing device 1 is provided with a mechanism 4 for loading and unloading calibration weights on and from the load sensor. The mechanism 4 can be of a known type which comprises levers, cams, a driving motor and associated members so that under control of the controller 3 two calibration weights 5a and 5b may be individually or simultaneously loaded and unloaded on and from the load sensor in the weighing device 1.

The weighing device 1 further includes a temperature sensor 6, the output from which is also digitized by the A-D convertor 2 and applied to the controller 3. A switch 7 is connected between the weighing device 1 and the A-D convertor 2 so that the output of the load sensor and that of the temperature sensor 6 may be applied to the A-D convertor 2 alternately at predetermined regular intervals, with the controller 3 controlling the operation of the switch 7.

The controller 3 is composed chiefly of a microcomputer comprising a central processing unit (CPU) 31, a read only memory (ROM) 32, a random access memory (RAM) 33, an input/output interface 34, etc., with a display 8 for indicating the measured value as well as the previously mentioned A-D convertor 2 being connected to the controller 3.

The ROM 32 stores a program for conducting an ordinary measurement and also a program for conducting calibration, which latter will be described later in detail. The RAM 33 includes an area for storing the digitized data of the output from the load sensor, a work area, an area for storing the temperature when the program for calibration is executed, and an area for storing the temperature when a linearity calibration is conducted in the calibration program.

Let it be assumed that to ensure the accuracy of weighing, the illustrated electronic balance requires a sensitivity calibration when a change of 0.5° C. has occurred to the ambient temperature and a linearity calibration when a temperature change of 5° C. has occurred. The CPU 31 operates in such a manner that when the program for conducting an ordinary weighing operation is executed, if the temperature data from the temperature sensor 6 indicate a change of more than 0.5° C. from the temperature experienced when the previous calibration was conducted, or when a predetermined period of time has passed since the previous calibration was conducted, the CPU issues a command for calibration, which causes a calibration program to be executed automatically. Let it also be assumed that only the total mass of the two weights 5a and 5b is known and written in the program for calibration, that the exact mass of neither of the two weights is known, and that the masses of the two weights are approximately equal.

Figure 2:
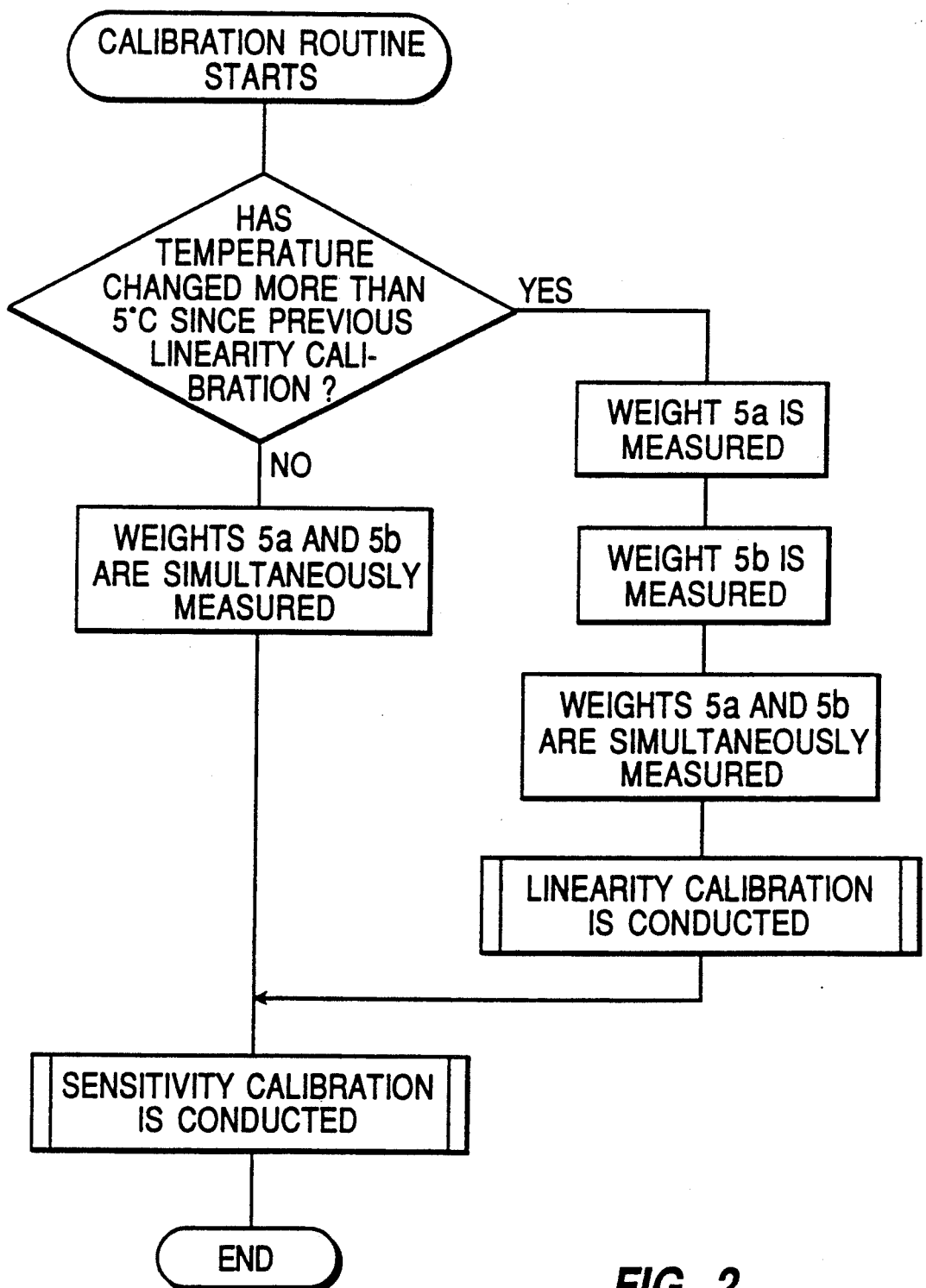
FIG. 2 is a flow chart showing a program for calibration written in the ROM shown in FIG. 1.

Now referring to the flow chart of FIG. 2 which shows a program for calibration written in the ROM 32, the operation of the apparatus of the invention will now be described.

As previously mentioned, when the ambient temperature has changed by 0.5° C., or a predetermined period of time has elapsed since the previous calibration was conducted, the CPU produces a command to start a calibration, whereupon the CPU compares the present temperature with the temperature experienced when the previous linearity calibration was conducted, and stored in the RAM 33. If the difference between the two temperatures is less than 5° C., the CPU causes the calibration weight loading and unloading mechanism 4 to put both the weights 5a and 5b simultaneously on the load sensor of the weighing device 1, so that the data then obtained is stored in the RAM 33, and a sensitivity calibration only is performed, and then the program for ordinary measurement proceeds. In practice, the sensitivity calibration is conducted with a renewed sensitivity coefficient obtained by calculation from the above-mentioned data, the data obtained at zero point, that is, when no load is applied to the balance, and the actual, total mass of both the weights 5a and 5b.

If the temperature difference exceeds 5° C., first the weight 5a and then the weight 5b are successively put on the load sensor to take the data obtained, and then both the weights 5a and 5b are simultaneously loaded on the load sensor, and on the basis of all these data a linearity calibration is conducted. In practice, the linearity calibration is conducted with a renewed coefficient in the equation for linearity calibration obtained by calculation from the data Dc obtained upon simultaneous loading of both the weights 5a and 5b on the load sensor, the data Do obtained at zero point with no load applied to the load sensor, and the data obtained at an intermediate point from the respective data Da and Db obtained with the weights 5a and 5b separately applied to the load sensor.

After the linearity calibration, a sensitivity calibration is conducted and then the program for ordinary measurement is resumed.

If the mass of each of the calibration weights 5a and 5b is accurately measured and stored, only the data obtained by measurement of the mass of either one of the weights 5a and 5b and the total mass of the two weights suffice for linearity calibration.

In accordance with the invention, when a command for calibration is issued, it is checked whether calibration is to be conducted with respect to sensitivity alone or both sensitivity and linearity, and the required calibration alone is conducted. This eliminates the waste of time and labor which have hitherto been spent in conducting an unnecessary linearity calibration whenever a sensitivity calibration is conducted, thereby enabling quick calibration.

What I claim is:

1. A method of calibrating the sensitivity and linearity of the weighing means of an electronic balance, comprising the steps of:

automatically conducting a sensitivity calibration when the ambient temperature has changed a first predetermined amount since the previous sensitivity calibration was conducted or when a predetermined period of time has passed since the previous sensitivity calibration was conducted;

determining whether said ambient temperature has changed at least a second predetermined amount since the previous linearity calibration was conducted, said second predetermined amount being greater than said first predetermined amount; and conducting a linearity calibration only when said ambient temperature has changed by at least said second predetermined amount.

2. The method of claim 1, wherein said electronic balance includes a pair of calibration weights and a mechanism for loading and unloading said calibration weights on and from said weighing means; and wherein said sensitivity calibration is conducted by renewing a sensitivity coefficient of said weighing means based on measurement data obtained from said weighing means when said pair of calibration weights are simultaneosly loaded on said weighing means, measurement data obtained from said weighing means when no load is applied to said weighing means, and the actual mass of said pair of calibration weights.

3. The method of claim 1, wherein said electronic balance includes a pair of calibration weights and a mechanism for loading and unloading said calibration weights on and from said weighing means; and wherein said linearity calibration is conducted by renewing a coefficient for linearity calibration based on measurement data obtained from said weighing means when said pair of calibration weights are loaded simultaneously on said weighing means, measurement data obtained from said weighing means at a zero point, and data at an intermediate point obtained from individual data obtained when each of said calibration weights is loaded on said weighing means.

4. An electronic balance comprising:

weighing means including a load sensor for weighing a load;

temperature sensor means for detecting the ambient temperature of said load sensor;

a plurality of built-in calibration weights;

means for loading and unloading said calibration weights on and from said load sensor;

means for indicating the mass of an object being measured; and control means for automatically conducting a sensitivity calibration of said load sensor when said ambient temperature has changed a first predetermined amount or a predetermined period of time has passed since the previous calibration was conducted, and for determining whether said ambient temperature has changed at least a second predetermined amount since a previous linearity calibration was conducted, said second predetermined amount being greater than said first predetermined amount, and for conducting a calibration of the linearity of said load sensor only when said ambient temperature has changed by at least said second predetermined amount.

5. The electronic balance of claim 4, wherein said controller conducts a sensitivity calibration by renewing a sensitivity coefficient of said weighing means by measurement data obtained from said weighing means when said calibration weights are simultaneously loaded on said weighing means, measurement data obtained from said weighing means when no load is applied to said weighing means, and the actual mass of said calibration weights.

6. The electronic balance of claim 4, wherein said controller conducts a linearity calibration by renewing a coefficient for linearity calibration by measurement data obtained from said weighing means when said calibration weights are loaded simultaneously on said weighing means, measurement data obtained from said weighing means at a zero point, and measurement data at an intermediate point obtained from individual data obtained when each of said calibration weights is loaded on said weighing means.

* * * * *